United States Patent
Chang et al.

(10) Patent No.: US 10,990,157 B2
(45) Date of Patent: Apr. 27, 2021

(54) WIDE-RANGE PCIE POWER-MEASURING APPARATUS

(71) Applicants: Goke Taiwan Research Laboratory Ltd., Taipei (TW); Xinsheng Intelligent Technology Co., Ltd., Jiangsu (CN)

(72) Inventors: Po-Chien Chang, Taipei (TW); Long-En Lee, Taipei (TW); Po-Wen Hsieh, Zhubei (TW)

(73) Assignees: Goke Taiwan Research Laboratory Ltd., Taipei (TW); Xinsheng Intelligent Technology Co., Ltd., Jiangsu (CN)

( * ) Notice: Subject to any disclaimer, the term of this patent is extended or adjusted under 35 U.S.C. 154(b) by 110 days.

(21) Appl. No.: 16/293,704

(22) Filed: Mar. 6, 2019

(65) Prior Publication Data
US 2020/0285297 A1    Sep. 10, 2020

(51) Int. Cl.
*G06F 1/3234* (2019.01)
*G06F 13/42* (2006.01)
*G06F 1/26* (2006.01)
*G06F 1/3215* (2019.01)

(52) U.S. Cl.
CPC ............ *G06F 1/3253* (2013.01); *G06F 1/263* (2013.01); *G06F 1/3215* (2013.01); *G06F 13/4221* (2013.01)

(58) Field of Classification Search
CPC ...... G06F 1/3253; G06F 1/3215; G06F 1/263; G06F 13/4221
See application file for complete search history.

(56) References Cited

FOREIGN PATENT DOCUMENTS

TW    503670    * 10/2015 ............. G06F 13/40

OTHER PUBLICATIONS

TW I503670 (Original version), Oct. 11, 2015, 32 pp. (Year: 2015).*
TW I503670 (English translate), Oct. 11, 2015, 15 pp. (Year: 2015).*

* cited by examiner

*Primary Examiner* — Toan M Le
(74) *Attorney, Agent, or Firm* — Alan D. Kamrath; Karin L. Williams; Mayer & Williams PC

(57) ABSTRACT

An apparatus for measuring power of a PCIe device in various modes under the control of a testing host includes two PCIe bus ports, a microcontroller unit, a current-measuring unit and a switch unit. In operation, the first PCIe bus port is electrically connected to the testing host, and the second PCIe bus port is electrically connected to the PCIe device. The microcontroller unit receives commands from and sends signals to the testing host via the first PCIe bus port. The current-measuring unit is in communication of electricity and signals with the second PCIe bus port and electrically connected to the microcontroller unit. The current-measuring unit includes large and small current-measuring paths. The switch unit includes two switches. Under the control of the microcontroller unit, the current-measuring unit is electrically connected to the first PCIe bus port via the large or small current-measuring path and the first or second switch.

5 Claims, 5 Drawing Sheets

WIDE-RANGE PCIE POWER-MEASURING APPARATUS

BACKGROUND OF INVENTION

1. Field of Invention

The present invention relates to a power-measuring apparatus and, more particularly, to a wide-range PCIe power-measuring apparatus.

2. Related Prior Art

Electronic products must consume power. It is preferred that an electronic product consumes as little power as possible so that it can be used for as long as possible before it is recharged. Hence, there are various power-saving specifications. Active-state power management ('ASPM') based on peripheral component interconnect express ('PCIe') enters a power-saving mode to save electricity if no data is transmitted. For example, a non-volatile memory express ('NVMe') is an optimized and high-performance expansible host-controlling interface. The basic concept of NVMe is to provide a direct processor with a transmission path via the PCIe. The primary advantage of NVMe is access to data with extremely low latency and high bandwidth. NVMe provides ASPM that includes automatic power state switch and automatic power management. For example, the equipment switches from Power State 0 to Power State 1 that consumes less power after being idle for 50 milliseconds. The equipment switches from Power State 1 to Power State 2 that consumes less power after being idle for 500 milliseconds. There is latency in the switches. Thus, NVMe is advantageous power management and extends endurance, and this is important for a portable device.

An electronic product is expected to operate normally only in a nominal range of input. For example, input voltage for PCIe NVMe equipment of is +3.3 V±9%. Hence, the input voltage cannot be higher than 3.597 V or lower than 3.003 V. Beyond this range, the operation will very likely be abnormal. Moreover, PCIe regulates that a maximum working current is 3 A and that a minimum current for PCIe NVMe equipment of is in the order of microwatt (equivalent to microampere) in a power-saving mode. It is a challenge to effectively measure the power of PCIe NVMe EQUIPMENT in various modes, particularly a power-saving mode that requires a small current and an operative mode that requires a large current.

There are two common methods for measuring the power of PCIe NVMe equipment. Firstly, a measuring apparatus that includes a miniature resistor is connected to a device under test ('DUT') in serial. A current is provided to the loop that consists of the measuring apparatus and the DUT. The current causes voltage drops in all resistors in the loop. The resistance in registers in the DUT is measured, converted into a digital signal via an analog to digital converter (ADC), and sent to a host interface. However, it is difficult to reach a balance between the range of the measurement and the precision of the measurement. If the resistance in the miniature resistor or the current is too large, the voltage drop in the miniature resistor will be too large and the voltage in the DUT will be too low (beyond the nominal range) to have the DUT operate normally. For example, if the resistance in the DUT is 1Ω and the current is 1 A, the voltage at a voltage-source end of the DUT will be reduced by as much as 1 V. If the voltage of a power supply is 3.3 V, the voltage delivered to the DUT will be 2.3 V (3.3 minus 1), smaller than 3.003 V, which is the minimum voltage for a PCIe power supply. That is, the voltage of the DUT is lower than the required operative voltage. For example, if the resistance is 0.1Ω and the current is 10 mA, the voltage will be 1 millivolt in the measurement, too low to be sampled by the ADC due to the scale of the ADC.

Secondly, a Hall-effect current sensor is used. A magnetic field is generated when a current goes through a carrier. Using a current clamp digital meter for example, a change of the magnetic field is converted to a voltage to indicate the current and converted into a readable quantified value. However, currents are generally large and resolution is low. The change of the magnetic field has to be large enough to be measured, and a common range thereof is 50 to 180 mV/A. That is, a current of 1 A generates a voltage of 50 to 180 mV. If measurement in the order of 1 mA is desired, the range of voltage will be 0.05 to 0.18 mV, too low to be detected by an ordinary Hall-effect product which is intended for measurement of large currents and low resolution. That is, it is very difficult to use an ordinary Hall-effect product to measure currents in the order of 1 mA.

As discussed above, in the prior art, it is difficult to effectively measure the power in a large range. In particular, it is difficult to measure the power of the PCIe NVMe equipment in the various modes including the power-saving mode, which involves a miniature current, and an operative mode, which involves a large current.

The present invention is therefore intended to obviate or at least alleviate the problems encountered in prior art.

SUMMARY OF INVENTION

It is an objective of the present invention to provide a wide-range power-measuring apparatus for measuring power of a PCIe device in various modes under the control of a testing host.

To achieve the foregoing objective, the wide-range power-measuring apparatus includes two PCIe bus ports, a microcontroller unit, a current-measuring unit and a switch unit. In operation, the first PCIe bus port is electrically connected to the testing host, and the second PCIe bus port is electrically connected to the PCIe device. The microcontroller unit receives commands from and sends signals to the testing host via the first PCIe bus port. The current-measuring unit is in communication of electricity and signals with the second PCIe bus port and electrically connected to the microcontroller unit. The current-measuring unit includes large and small current-measuring paths. The switch unit includes two switches. Under the control of the microcontroller unit, the current-measuring unit is electrically connected to the first PCIe bus port via the large or small current-measuring path and the first or second switch.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
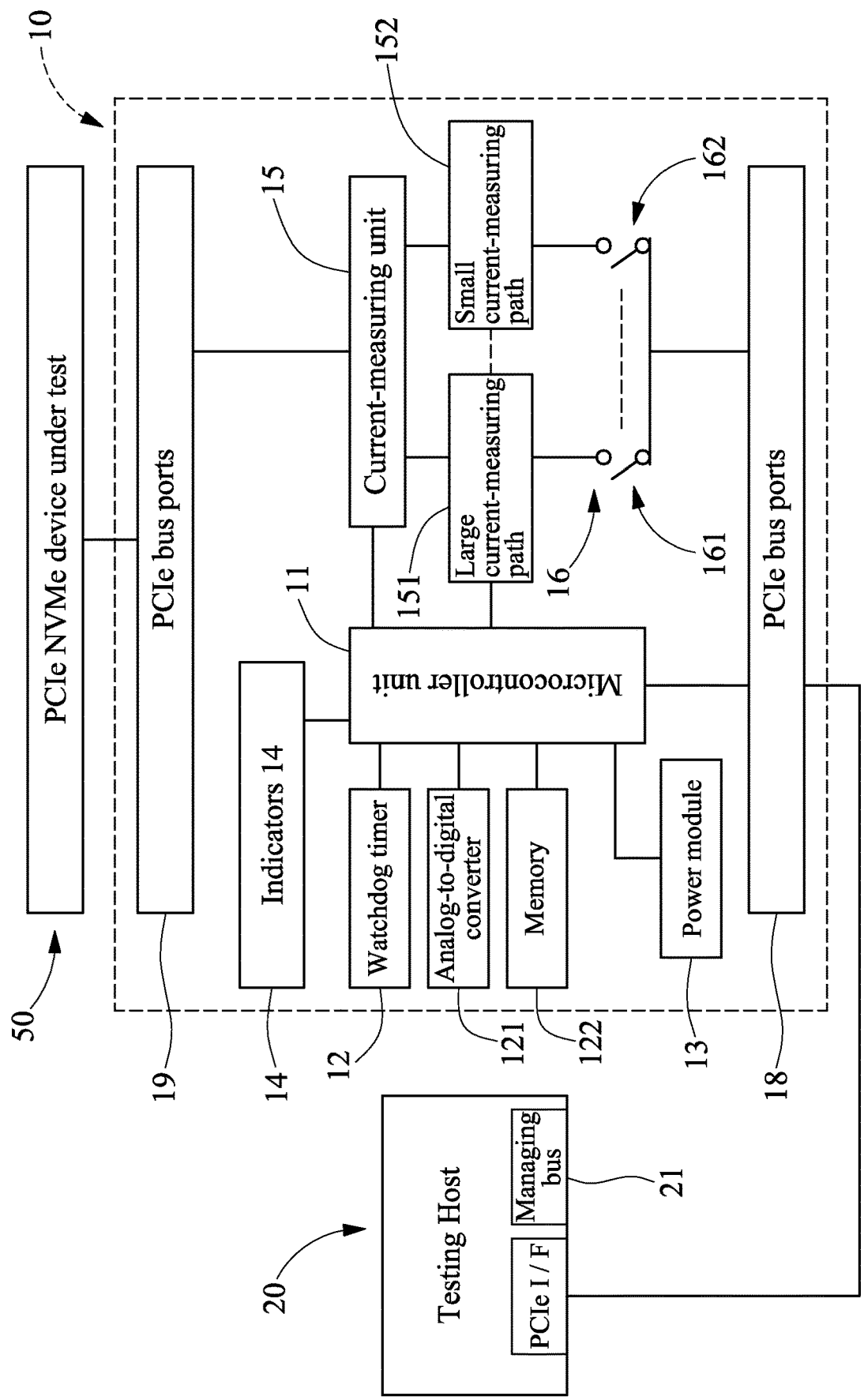
FIG. 1 is a block diagram of a wide-range PCIe power-measuring apparatus according to the preferred embodiment of the present invention.

Referring to FIG. 1, a wide-range PCIe power-measuring apparatus includes a microcontroller unit 11 ('MCU'), a current-measuring unit 15 ('PMU'), a switch unit 16 and two PCIe bus ports 18 and 19 according to the preferred embodiment of the present invention. The wide-range power measuring apparatus 10 is electrically connected to a testing host 20 via the PCIe bus port 18, which is used as a source end. The wide-range power measuring apparatus 10 is electrically connected to a PCIe NVMe device under test ('DUT') 50 via the PCIe bus port 19, which is used as an output end. Thus, the wide-range PCIe power measuring apparatus 10 can measure power of the DUT 50 in various modes such as a small current in a power-saving mode and a large current in an operative mode, thereby ensuring normal operation of the DUT 50.

The microcontroller unit 11 is electrically connected to the testing host 20 regarding electricity and signals via the PCIe bus port 18. Thus, the microcontroller unit 11 can receive commands from and send signals to the testing host 20 to execute the commands including but not limited to switching various current-measuring paths and measuring and calculating power. Furthermore, the microcontroller unit 11 can record an average of initial values and initializing level calibration of analog-to-digital conversion when the wide-range power measuring apparatus 10 is not electrically connected to the DUT 50. According to some embodiments, the microcontroller unit 11 includes a watchdog timer ('WDT') 12, an analog-to-digital converter ('ADC') 121 and a memory 122 such as a MCU-flash. The watchdog timer 12 is calculating an average of values of the analog-to-digital converter 121 all the time and saves the initial value as compensation in the memory 122, without having to wait in the period of measurement by the analog-to-digital conversion. According to some other embodiments, the microcontroller unit 11 further includes a power module 13 to provide the microcontroller unit 11 with power. Moreover, according to some other embodiments, the microcontroller unit 11 is electrically connected to a set of indicators 14 to indicate power-on and power-off states of the DUT 50 in various modes.

The microcontroller unit 11 is electrically connected to the testing host 20 regarding electricity and signals via the PCIe bus port 18. Thus, the microcontroller unit 11 can receive commands from and send signals to the testing host 20 to execute the commands including but not limited to switching between various current-measuring paths and measuring and calculating power. Furthermore, the microcontroller unit 11 can record an average of initial values and initializing level calibration of analog-to-digital conversion when the wide-range power measuring apparatus 10 is not electrically connected to the DUT 50. According to some embodiments, the microcontroller unit 11 includes a watchdog timer ('WDT') 12, an analog-to-digital converter ('ADC') 121 and a memory 122 such as a MCU-flash. The watchdog timer 12 is calculating an average of values of the analog-to-digital converter 121 all the time and saves the initial value as compensation in the memory 122, without having to wait in the period of measurement by the analog-to-digital conversion. According to some other embodiments, the microcontroller unit 11 further includes a power module 13 to provide the microcontroller unit 11 with power. Moreover, according to some other embodiments, the microcontroller unit 11 is electrically connected to a set of indicators 14 to indicate power-on and power-off states of the DUT 50 in various modes.

Figure 2:
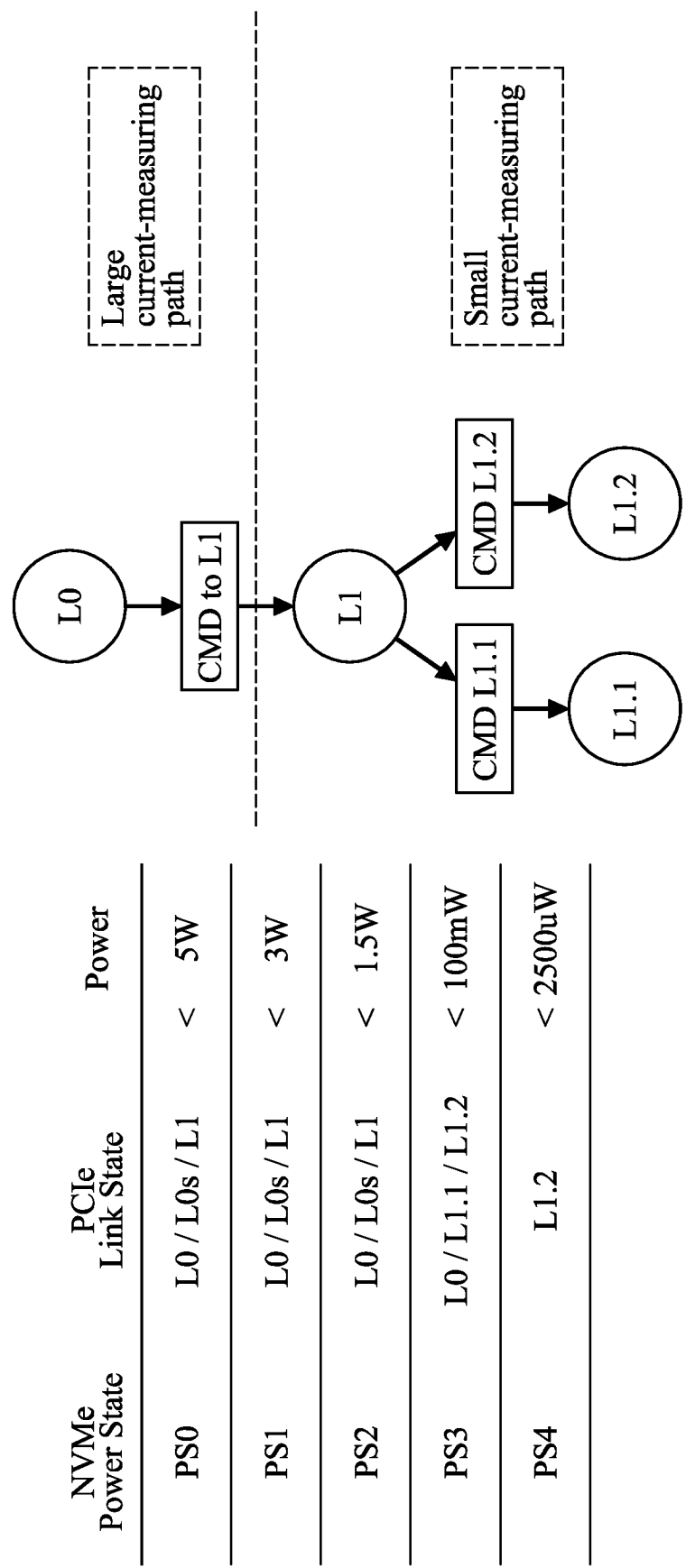
FIG. 2 shows various modes of NVMe equipment in which the wide-range PCIe power-measuring apparatus shown in FIG. 1 is operable.

As mentioned above, the wide-range PCIe power-measuring apparatus 10 can be used to measure the DUT 50. Referring to FIG. 2, there are shown electrically connections and specifications of power of NVMe equipment in various modes. The current can be 3 A to several $\mu A$ in compliance with the PCIe NVMe. Hence, referring to FIGS. 2 and 3, the sampled current of the large current-measuring path 151 is set to be 3 A to 10 mA. The sampled current of the small current-measuring path 152 is set to be 100 mA to 10 $\mu A$.

Figure 4:
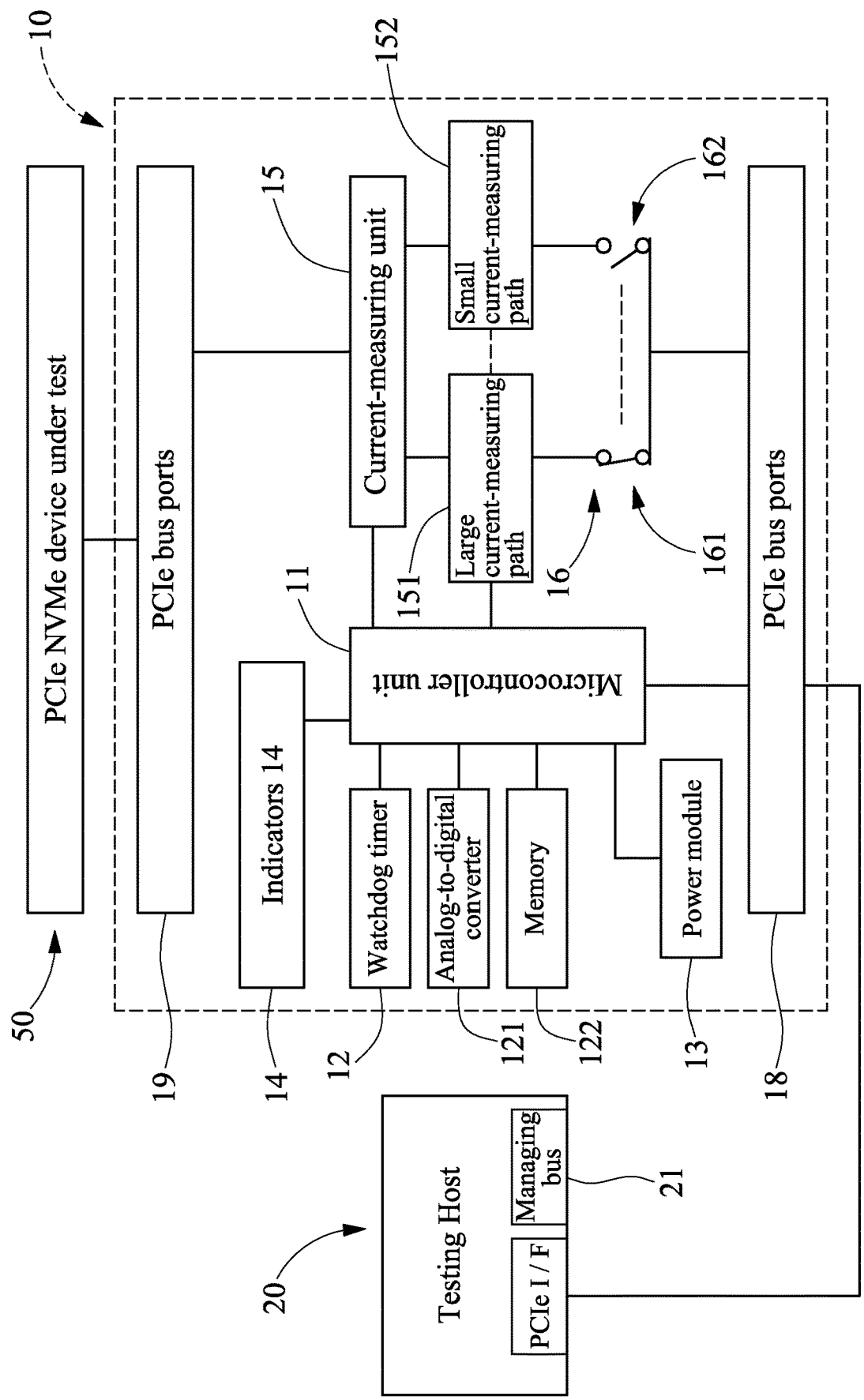
FIG. 4 is a block diagram of the wide-range PCIe power-measuring apparatus shown in FIG. 1 in measurement of a large current.
Figure 5:
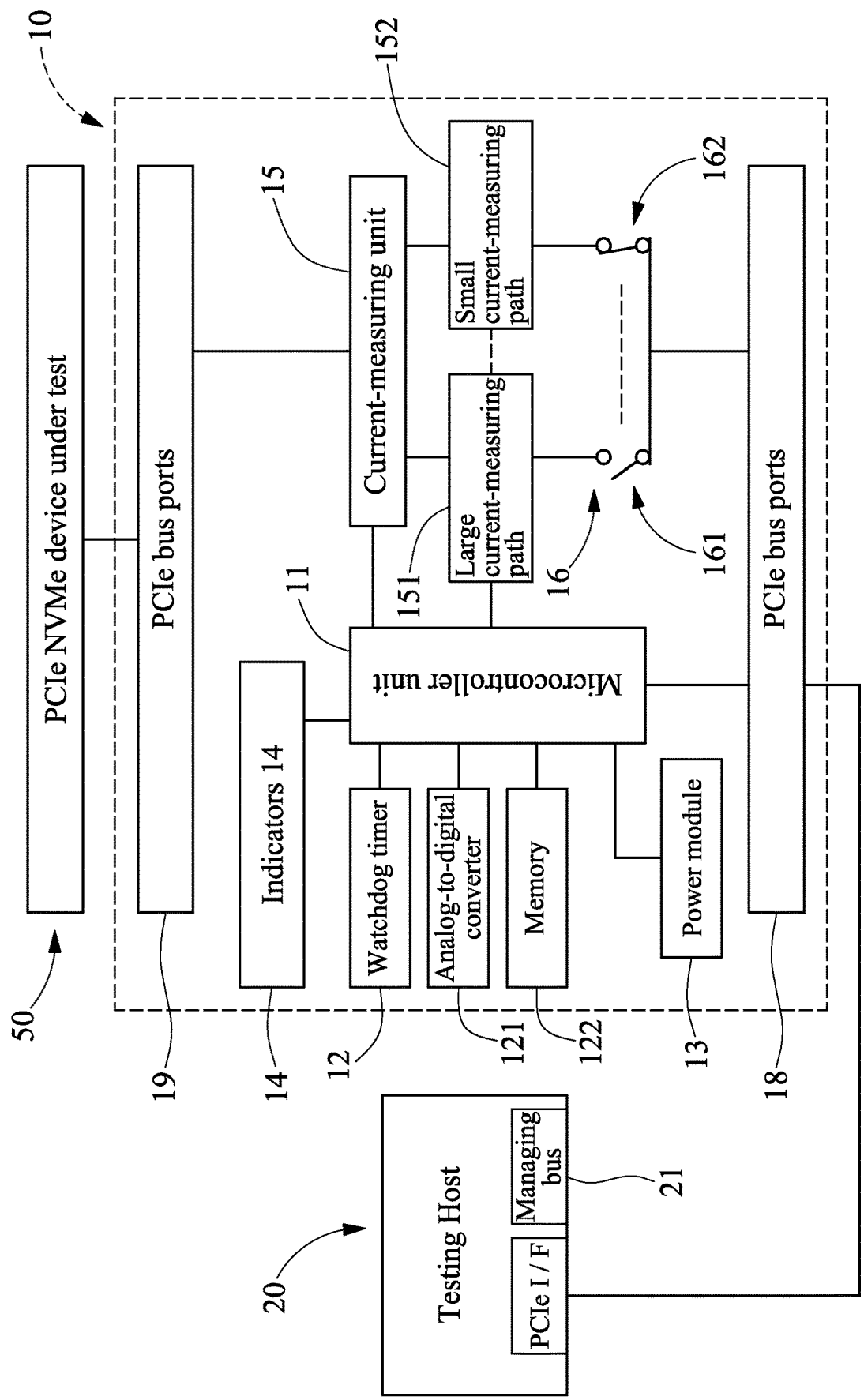
FIG. 5 is a block diagram of the wide-range PCIe power-measuring apparatus shown in FIG. 1 in measurement of a small current.

In measurement, the DUT 50 is electrically connected to the PCIe bus port 19. The testing host 20 is electrically connected to the PCIe bus port 18, thereby allowing the testing host 20 to provide the wide-range power measuring apparatus 10 with power and PCIe signals. Referring to FIGS. 4 and 5, the testing host 20 includes a system management bus 21 that can be electrically connected to the microcontroller unit 11 of the wide-range power measuring apparatus 10.

Then, the testing host 20 provides electricity to the DUT 50 via the wide-range power measuring apparatus 10 according to various modes of the DUT 50. The modes include a power-saving mode, a normal mode, an idle mode and a high-performance mode. According to an expected current, the microcontroller unit 11 of the wide-range power measuring apparatus 10 turns each of the first and second switches 161 and 162 of the switch unit 16 of the current-measuring unit 15 to a closed or open position so that electricity is sent to or blocked from the DUT 50. According to the expected current, the microcontroller unit 11 turns to the large current-measuring path 151 or the small current-measuring path 152, and samples an actual current and/or power in the large current-measuring path 151 or the small current-measuring path 152. The microcontroller unit 11 measures and calculates the power and then sends the measured values to the testing host 20.

Figure 3:
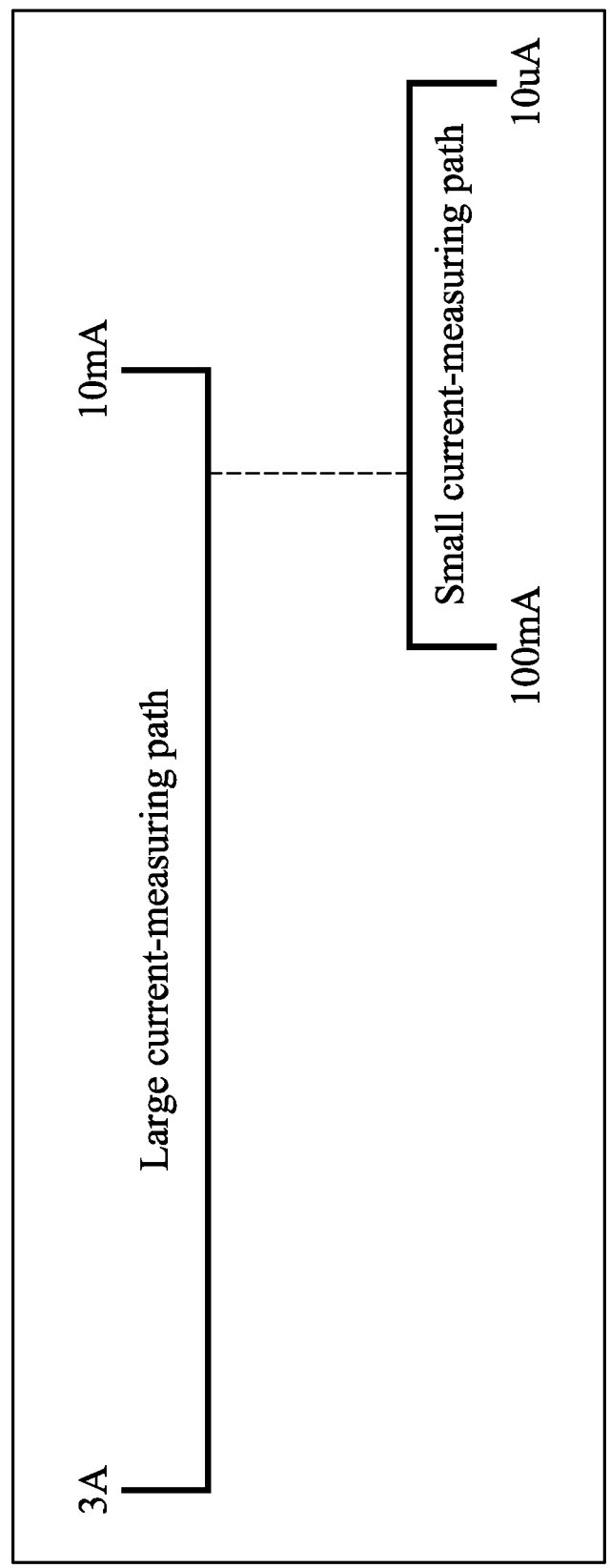
FIG. 3 shows two ranges of current along two different paths of the NVMe equipment.

Referring to FIGS. 2 and 3, in compliance with the regulations for PCIe NVMe equipment, the range of current is 3 A to several $\mu A$. By calculation, proper resistances of the current-measuring unit 15 of the wide-range power measuring apparatus 10 are 0.05$\Omega$ and 3$\Omega$.

When the resistance is 0.05$\Omega$ for example, the current is 3 A at the maximum power so that a voltage drop in the circuit is 0.15 V. If a nominal voltage is 3.3 V, the actual voltage will be 3.15 (3.3 minus 0.15) V, in compliance with the regulation for voltage (3.003 V). By using an ×20 amplifier, the large current-measuring path 151 can measure currents in a range of 3 A to 10 mA.

When the resistance is 3$\Omega$ for example, the current is 30 $\mu A$ at the minimum power so that the voltage drop in the circuit is 90 $\mu V$. By using an ×20 amplifier, the large current-measuring path 151 can measure currents in a range of 100 mA to 10 $\mu A$.

As mentioned above, the wide-range PCIe power-measuring apparatus 10 uses the PCIe bus ports 18 and 19 to electrically connect to the testing host 20 and the DUT 50, respectively. The wide-range PCIe power measuring apparatus 10 uses the microcontroller unit 11 to execute commands. The current-measuring unit 15 includes the large current-measuring path 151 and the small current-measuring path 152, thereby allowing the wide-range PCIe power measuring apparatus 10 to transfer large and small currents under the control of the. In compliance with commands from the testing host 20, according to the expected current, the wide-range PCIe power measuring apparatus 10 switches between the paths, and transfer electricity to or block electricity from the DUT 50. Thus, the power of the DUT 50 in various modes can be measured. Advantageously, the wide-range PCIe power measuring apparatus 10 can measure a wide range of currents. Moreover, the wide-range PCIe power measuring apparatus 10 includes at least two paths for sampling the power, thereby further enlarging the measurable range of currents that it can measure. For example, the wide-range PCIe power measuring apparatus 10 can measure the very small current in the power-saving mode or the large current in the high performance mode, thereby ensuring normal operation of DUT 50.

Moreover, the switch unit 16 can receive commands from the microcontroller unit 11, thereby allowing the wide-range PCIe power measuring apparatus 10 to transfer electricity to or block electricity from the DUT 50 in a programmable manner.

Furthermore, the microcontroller unit 11 efficiently samples the analog-to-digital conversion and provides an average, thereby improving the precision of the measurement of the currents and rendering initialization calibration possible. A corrected value is saved in the memory 122 of the microcontroller unit 11, thereby reducing errors of the measurement of the currents.

In addition, the microcontroller unit 11 of the wide-range PCIe power measuring apparatus 10 uses the watchdog timer 12 and the analog-to-digital converter 121 to calculate the analog-to-digital conversion value continuously. Thus, the testing host 20 can read the values of the currents at any given point of time, and the measurement of the currents is fast, and the wide-range PCIe power measuring apparatus 10 is practical.

The present invention has been described via the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A wide-range power-measuring apparatus for measuring power of a Peripheral Component Interconnect Express device in various modes under the control of a testing host, the wide-range power-measuring apparatus comprising:

a first Peripheral Component Interconnect Express bus port electrically connected to the testing host in operation;

a second Peripheral Component Interconnect Express bus port electrically connected to the Peripheral Component Interconnect Express device in operation;

a microcontroller unit in communication of electricity and signals with the testing host via the first Peripheral Component Interconnect Express bus port;

a current-measuring unit in communication of electricity and signals with the Peripheral Component Interconnect Express device via the second Peripheral Component Interconnect Express bus port, wherein the current-measuring unit comprises large and small current-measuring paths electrically connected to the microcontroller unit so that the current-measuring unit can sample and measure currents via a selected one of the large and small current-measuring paths under the control of the microcontroller unit; and a switch unit electrically connected to the first Peripheral Component Interconnect Express bus port, wherein the switch unit comprises a first switch corresponding to the large current-measuring path and a second switch corresponding to the small current-measuring path so that one of the first and second switches is turned to a closed position to transfer electricity to the Peripheral Component Interconnect Express device from the corresponding one of the large and small current-measuring paths and the other one of the first and second switches is turned to an open position to block electricity from the Peripheral Component Interconnect Express device under the control of the testing host.

2. The wide-range power-measuring apparatus according to claim 1, wherein the Peripheral Component Interconnect Express device is an Non-Volatile Memory Express device.

3. The wide-range power-measuring apparatus according to claim 1, wherein the microcontroller unit comprises a watchdog timer, an analog-to-digital converter and a memory, wherein the watchdog timer continuously calculates an average of values of the analog-to-digital converter and stores the average in the memory, so that values of currents can be read at any given point of time.

4. The wide-range power-measuring apparatus according to claim 1, wherein the microcontroller unit comprises a power module for providing the microcontroller unit with electricity.

5. The wide-range power-measuring apparatus according to claim 1, further comprising indicators electrically connected to the microcontroller unit to indicate ON and OFF states of the Peripheral Component Interconnect Express device in various modes.

* * * * *